"(12) United States Patent
Nie

(10) Patent No.: US 9,667,143 B2
(45) Date of Patent: May 30, 2017

(54) POWER CONVERSION CIRCUIT AND ELECTRONIC DEVICE WITH THE SAME

(71) Applicant: ScienBiziP Consulting (Shenzhen) CO., LTD., Shenzhen (CN)

(72) Inventor: Qiang Nie, Shenzhen (CN)

(73) Assignee: ScienBiziP Consulting(Shenzhen) Co., Ltd., Shenzhen (CN)

( * ) Notice: Subject to any disclaimer, the term of this patent is extended or adjusted under 35 U.S.C. 154(b) by 555 days.

(21) Appl. No.: 14/287,046

(22) Filed: May 25, 2014

(65) Prior Publication Data

US 2014/0354253 A1 Dec. 4, 2014

(30) Foreign Application Priority Data

May 29, 2013 (CN) .......................... 2013 1 02060708

(51) Int. Cl.
*H02H 7/00* (2006.01)
*H02M 3/158* (2006.01)
*H02M 1/32* (2007.01)
*H02H 3/20* (2006.01)

(52) U.S. Cl.
CPC ............ *H02M 3/158* (2013.01); *H02H 3/202* (2013.01); *H02M 1/32* (2013.01)

(58) Field of Classification Search
CPC ..................................................... H02M 3/158

USPC ............................................................ 361/18
See application file for complete search history.

(56) References Cited

U.S. PATENT DOCUMENTS

| | | | |
|---|---|---|---|
| 3,809,999 A * | 5/1974 | Smith ................... | H02M 3/156 323/285 |
| 4,051,425 A * | 9/1977 | Smith ................... | H02M 1/092 323/237 |
| 7,265,953 B2 * | 9/2007 | Hourai ................... | G01R 31/40 361/159 |

* cited by examiner

*Primary Examiner* — Stephen W Jackson
(74) *Attorney, Agent, or Firm* — Steven Reiss

(57) ABSTRACT

A power conversion circuit includes an input port, an output port, a power conversion chip, a path switch, and a protection module. The input port is electrically connected to a power source and the output port is electrically connected to a function module. The power conversion chip includes a voltage input pin electrically connected to the input port and a voltage output pin electrically connected to the output port. The power conversion chip converts the power voltage to an output voltage. The path switch includes a control terminal, a first path terminal connected to the input port, and a second path terminal connected to the voltage input pin. The protection module is connected between the control terminal and the output port, and detects the output voltage on the output port, and turns off the path switch when the output voltage is greater than a predetermined voltage.

14 Claims, 2 Drawing Sheets

POWER CONVERSION CIRCUIT AND ELECTRONIC DEVICE WITH THE SAME

FIELD

The present disclosure relates to electronic devices, and particularly to an electronic device with a power supply conversion circuit and the power supply conversion circuit.

BACKGROUND

Electronic devices, such as mobile phones and tablet computers usually include a direct current (DC) power conversion circuit. A common DC power conversion circuit includes a DC power source chip and a protection circuit. The DC power source chip includes an enable pin and an output pin, converts a voltage to a suitable voltage and powers electronic components of the electronic device via the output pin. The protection circuit is connected between the output pin and the enable pin of the DC power source chip. When the voltage of the output pin is greater than a permitted value, the protection circuit would output a signal to the enable pin of the DC power source chip causing the DC power source chip to stop working. However, when the DC power source chip is damaged, the DC power source chip remains to output the voltage via the output pin although the enable pin receives the signal from the protection circuit.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Embodiments of the present disclosure will be described with reference to the accompanying drawings.

Figure 1:
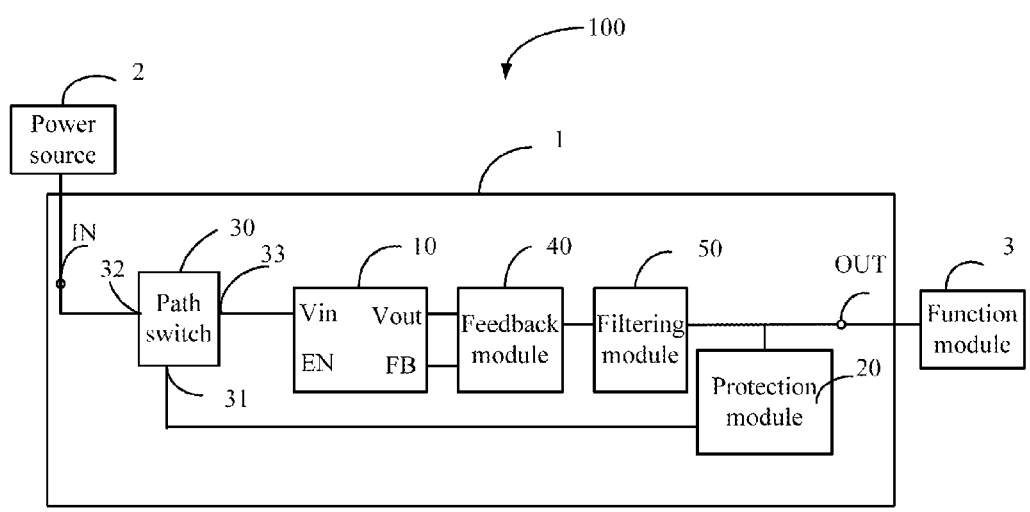
FIG. 1 is a block diagram of an embodiment of an electronic device with a power conversion circuit.

FIG. 1 illustrates a block diagram of an electronic device 100 with a power conversion circuit 1. The electronic device 100 includes the power conversion circuit 1, a power source 2, and a function module 3. In the embodiment, the function module 3 includes many function components which implement one or more functions, such as a central processing unit, a display unit, a storage unit, and the like. The electronic device 100 can be a mobile phone, a tablet computer, a digital camera, a digital photo frame, and the like.

The power conversion circuit 1 includes an input port IN, an output port OUT, a power conversion chip 10, a protection module 20, and a path switch 30. The input port IN is electrically connected to the power source 2 and obtains a power voltage from the power source 2, and the output port OUT is electrically connected to the function module 3.

The power conversion chip 10 includes a voltage input pin Vin and a voltage output pin Vout. The voltage input pin Vin is electrically connected to the input port IN of the power conversion circuit 1 to receive the power voltage obtained by the input port IN, and the voltage output pin Vout is electrically connected to the output port OUT. The voltage conversion chip 10 is used to convert the power voltage received by the voltage input pin Vin to an output voltage, and output the output voltage to the output port OUT via the voltage output pin Vout, thus to provide the output voltage to the function module 3 via the output port OUT.

The path switch 30 includes a control terminal 31, a first path terminal 32, and a second path terminal 33. The first path terminal 32 is connected to the input port IN, and the second path terminal 33 is connected to the voltage input pin Vin of the power conversion chip 10.

The protection module 20 is connected between the control terminal 31 of the path switch 30 and the output port OUT. The protection module 20 is used to detect the output voltage on the output port OUT, and produce an off control signal to the control terminal 31 of the path switch 30 to turn off the path switch 30 when the output voltage is greater than a predetermined voltage. Therefore, a connection between the voltage input pin Vin and the input port IN is cut off, and the power conversion chip 10 stops outputting the output voltage due to the power conversion chip 10 stops receiving the power voltage from the input port IN.

Therefore, in the present disclosure, by adding the path switch 30, when the output voltage is abnormal, namely, the output voltage is greater than the predetermined voltage, the path switch 30 is turned off, and the power voltage stops being output to the power conversion chip 10. Accordingly, the power conversion chip 10 stops outputting the output voltage no matter the power conversion chip 10 is damaged or not.

FIG. 1 illustrates that in the embodiment, the power conversion circuit 1 further includes a feedback module 40, and the power conversion chip 10 further includes a feedback pin FB. The feedback module 40 is connected between the output port OUT and the feedback pin FB of the power conversion chip 10, and is used to produce a feedback signal according to the output voltage of the output port OUT. The power conversion chip 10 further adjusts the output voltage according to the feedback signal received by the feedback pin FB.

In the embodiment, the power conversion circuit 1 further includes a filtering module 50. The filtering module 50 is electrically connected between the voltage output pin Vout and the output port OUT, and is used to filter noise from the output voltage.

The power conversion chip 10 further includes an enable pin EN, the enable pin EN is electrically connected to the second path terminal of the path switch 30. When the path switch 30 is turned on, the power voltage obtained by the input port IN is transmitted to the enable pin EN via the path switch 30, which is turned on, thus enabling the power conversion chip 10 to work.

Figure 2:
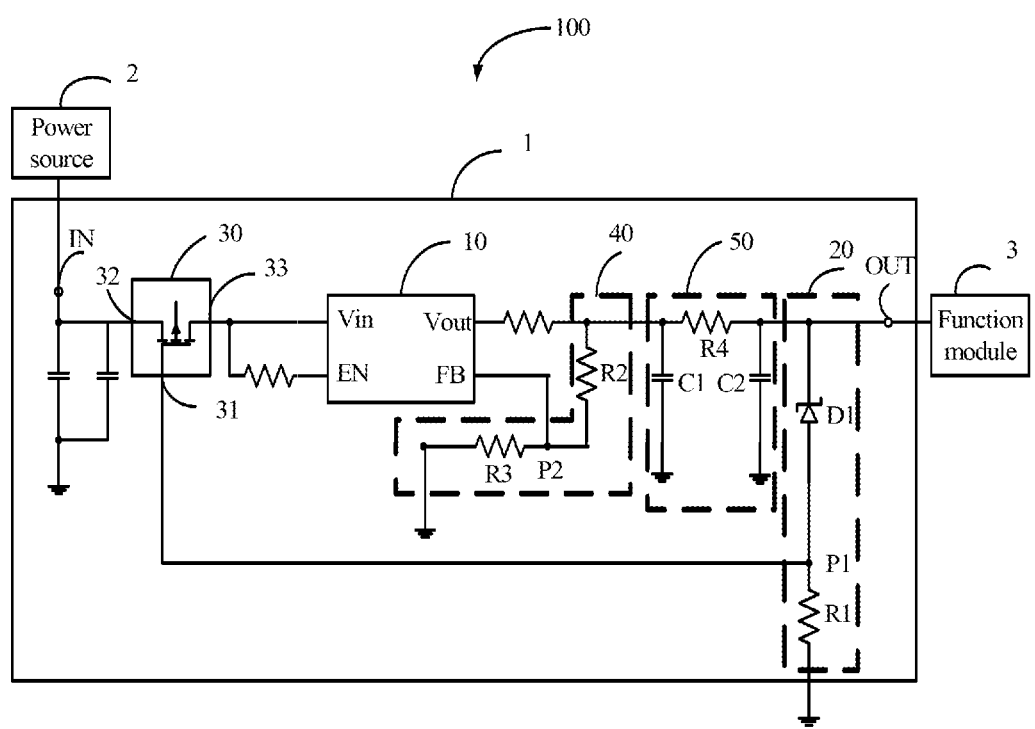
FIG. 2 is a circuit diagram of an embodiment of an electronic device with a power conversion circuit.

FIG. 2 illustrates a circuit diagram of the electronic device 100. The protection module 20 includes a voltage regulator diode D1 and a resistor R1 connected between the output port OUT and ground in series. A cathode of the voltage regulator diode D1 is connected to the output port OUT, and an anode of the voltage regulator diode D1 is connected to the resistor R1.

The path switch 30 includes a p-channel metal-oxide-semiconductor field effect transistor (PMOSFET) Q1. A gate, a source, and a drain of the PMOSFET Q1 respectively constitute the control terminal 31, the first path terminal 32, and the second path terminal 33 of the path switch 30. In another embodiment, the path switch 30 can be a negative-positive-negative (NPN) bipolar junction transistor (BJT), and a base, an emitter, and a collector of the NPN BJT respectively constitute the control terminal 31, the first path terminal 32, and the second path terminal 33 of the path switch 30.

The gate of the PMOSFET Q1 is connected to a connection node P1 of the voltage regulator diode D1 and the resistor R1, the source of the PMOSFET Q1 is connected to the input port IN, and the drain of the PMOSFET Q1 is connected to the voltage input pin Vin of the power conversion chip 10.

In the embodiment, the predetermined voltage is equal to a breakdown voltage of the voltage regulator diode D1, and the off control signal is a digital-high signal.

When the output voltage of the output port OUT is less than the predetermined voltage, the voltage regulator diode D1 is turned off, there is no current flowing though the voltage regulator diode D1 and the resistor R1. The gate of the PMOSFET Q1 is grounded via the resistor R1 and obtains a low voltage, and the PMOSFET Q1 is turned on accordingly. The power voltage obtained by the input port IN is output to the voltage input pin Vin via the PMOSFET Q1 which is turned on. As described above, the power conversion chip 10 then converts the power voltage to the output voltage to power the function module 3 via the voltage output pin Vout and the output port OUT.

When the voltage of the output port OUT is greater than the predetermined voltage, namely the voltage of the output port OUT is greater than the breakdown voltage of the voltage regulator diode D1, the voltage regulator diode D1 is turned on and a current flowing through the resistor R1 is generated. Therefore, the connection node P1 is at high voltage, and the gate of the PMOSFET Q1 obtains the high voltage from the connection node P1, thus the PMOSFET Q1 is turned off accordingly. The connection between the input port IN and the voltage input pin Vin is cut off accordingly, thus achieving an over-voltage protection function.

The feedback module 40 includes resistors R2, R3 electrically coupled between the voltage output pin Vout and ground. A connection node P2 of the resistors R2, R3 is connected to the feedback pin FB of the power conversion chip 10. A voltage of the connection node P2 is the feedback signal. The voltage of the connection node P2 is proportional with the output voltage output by the voltage output pin Vout, and reflects the output voltage of the voltage output pin Vout. The power conversion chip 10 adjusts the output voltage output by the voltage output pin Vout according to the voltage of the connection node P2.

The filtering module 50 includes a resistor R4, and capacitors C1, C2. The resistor R4 is electrically connected between the voltage output pin Vout and the output port OUT. The capacitor C1 is connected between one end of the resistor R4 and ground, and the capacitor C2 is connected between another end of the resistor R4 and ground. The resistor R4 and the capacitors C1, C2 constitute an RC direct current filter circuit for filtering noise signals from the output voltage output by the voltage output pin Vout, and then output the filtered output voltage to the output port OUT.

The power conversion circuit 1 also can include other electronic components, because the electronic components are unrelated with the present disclosure, and the description of these electronic components are omitted herein.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A power conversion circuit comprising:
   an input port configured to electrically connect to a power source and to obtain a power voltage from the power source;
   an output port configured to electrically connect to a function module;
   a power conversion chip comprising a voltage input pin and a voltage output pin, wherein, the voltage input pin is electrically connected to the input port and receives the power voltage obtained by the input port, and the voltage output pin is electrically connected to the output port, the power conversion chip is configured to convert the power voltage received by the voltage input pin to an output voltage, and output the output voltage to the output port via the voltage output pin, thus to provide the output voltage to the function module via the output port;
   a path switch comprising a control terminal, a first path terminal, and a second path terminal, the first path terminal being connected to the input port, and the second path terminal being connected to the voltage input pin of the power conversion chip; and
   a protection module connected between the control terminal and the output port, and configured to detect the output voltage on the output port, and produce an off control signal to the control terminal of the path switch to turn off the path switch when the output voltage is greater than a predetermined voltage.

2. The power conversion circuit according to claim 1, further comprising a feedback module, wherein the power conversion chip further comprises a feedback pin; the feedback module is connected between the output port and the feedback pin of the power conversion chip, and is configured to produce a feedback signal according to the output voltage of the output port, the power conversion chip is further configured to adjust the output voltage according to the feedback signal received by the feedback pin.

3. The power conversion circuit according to claim 1, further comprising a filtering module electrically connected between the voltage output pin and the output port, and configured to filter noise from the output voltage output by the voltage output pin.

4. The power conversion circuit according to claim 1, wherein the protection module comprises a voltage regulator diode and a first resistor connected between the output port and ground in series, a cathode of the voltage regulator diode is connected to the output port, and an anode of the voltage regulator diode is connected to the first resistor.

5. The power conversion circuit according to claim 4, wherein the path switch comprises a p-channel metal-oxide-semiconductor field effect transistor (PMOSFET), a gate, a source, and a drain of the PMOSFET respectively constitute the control terminal, the first path terminal, and the second path terminal of the path switch; the gate of the PMOSFET is connected to a connection node of the voltage regulator diode and the first resistor, the source of the PMOSFET is connected to the input port, and the drain of the PMOSFET is connected to the voltage input pin of the power conversion chip.

6. The power conversion circuit according to claim 2, wherein the feedback module comprises a second resistor and a third resistor electrically connected between the voltage output pin and ground, a connection node of the second resistor and the third resistor is connected to the feedback pin of the power conversion chip, a voltage of the connection node constitutes the feedback signal.

7. The power conversion circuit according to claim 3, wherein the filtering module comprises a fourth resistor, a first capacitor, and a second capacitor, the fourth resistor is electrically connected between the voltage output pin and the output port, the first capacitor connected between one end of the fourth resistor and ground, and the second capacitor is connected between another end of the fourth resistor and ground, the fourth resistor, the first capacitor, and the second capacitor constitute a RC direct current filter circuit.

8. An electronic device comprising:
 a power source;
 a function module; and
 a power conversion circuit comprising:
 an input port electrically connected to a power source and configured to obtain a power voltage from the power source; and the output port is electrically connected to the function module;
 an output port electrically connected to a function module;
 a power conversion chip comprising a voltage input pin and a voltage output pin, wherein, the voltage input pin is electrically connected to the input port and receives the power voltage obtained by the input port, and the voltage output pin is electrically connected to the output port, the power conversion chip is configured to convert the power voltage received by the voltage input pin to an output voltage, and output the output voltage to the output port via the voltage output pin, thus to provide the output voltage to the function module via the output port;
 a path switch comprising a control terminal, a first path terminal, and a second path terminal, the first path terminal being connected to the input port, and the second path terminal being connected to the voltage input pin of the power conversion chip; and
 a protection module connected between the control terminal and the output port, and configured to detect the output voltage on the output port, and produce an off control signal to the control terminal of the path switch to turn off the path switch when the output voltage is greater than a predetermined voltage.

9. The electronic device according to claim 8, wherein the power conversion circuit further comprises a feedback module, the power conversion chip further comprises a feedback pin; the feedback module is connected between the output port and the feedback pin of the power conversion chip, and is configured to produce a feedback signal according to the output voltage of the output port, the power conversion chip is further configured to adjust the output voltage according to the feedback signal received by the feedback pin.

10. The electronic device according to claim 8, wherein the power conversion circuit further comprises a filtering module electrically connected between the voltage output pin and the output port, and configured to filter noise from the output voltage output by the voltage output pin.

11. The electronic device according to claim 8, wherein the protection module comprises a voltage regulator diode and a first resistor connected between the output port and ground in series, a cathode of the voltage regulator diode is connected to the output port, and an anode of the voltage regulator diode is connected to the first resistor.

12. The electronic device according to claim 11, wherein the path switch comprises a p-channel metal-oxide-semiconductor field effect transistor (PMOSFET), a gate, a source, and an drain of the PMOSFET respective constitute the control terminal, the first path terminal, and the second path terminal of the path switch; the gate of the PMOSFET is connected to a connection node of the voltage regulator diode and the first resistor, the source of the PMOSFET is connected to the input port, and the drain of the PMOSFET is connected to the voltage input pin of the power conversion chip.

13. The electronic device according to claim 9, wherein the feedback module comprises a second resistor and a third resistor electrically connected between the voltage output pin and ground, a connection node of the second resistor and the third resistor is connected to the feedback pin of the power conversion chip, a voltage of the connection node constitutes the feedback signal.

14. The electronic device according to claim 10, wherein the filtering module comprises a fourth resistor, a first capacitor, and a second capacitor, the fourth resistor is electrically connected between the voltage output pin and the output port, the first capacitor connected between one end of the fourth resistor and ground, and the second capacitor is connected between another end of the fourth resistor and ground, the fourth resistor, the first capacitor, and the second capacitor constitute a RC direct current filter circuit.

* * * * *